(12) United States Patent
Okada

(10) Patent No.: US 7,174,046 B2
(45) Date of Patent: Feb. 6, 2007

(54) IMAGE QUANTIZATION AND CODING BASED ON ADAPTIVE THRESHOLD

(75) Inventor: Shigeyuki Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 614 days.

(21) Appl. No.: 10/077,208

(22) Filed: Feb. 14, 2002

(65) Prior Publication Data

US 2002/0154825 A1    Oct. 24, 2002

(30) Foreign Application Priority Data

Feb. 26, 2001   (JP)   ............................. 2001-051075

(51) Int. Cl.
  *G06K 9/36*   (2006.01)
  *G06T 9/00*   (2006.01)

(52) U.S. Cl. ................... 382/239; 382/232; 382/240

(58) Field of Classification Search ........ 382/238–253, 382/232, 233; 348/398.1, 408; 375/240.19
See application file for complete search history.

(56) References Cited

U.S. PATENT DOCUMENTS 5,121,216 A * 6/1992 Chen et al. ................. 382/239
5,963,673 A * 10/1999 Kodama et al. ............ 382/239
6,678,419 B1 * 1/2004 Malvar ....................... 382/240

FOREIGN PATENT DOCUMENTS

| JP | H05-276499 | 10/1993 |
|----|------------|---------|
| JP | H7-87330 A | 3/1995 |
| JP | H9-214772 A | 8/1997 |
| WO | WO 99/17257 | 4/1999 |

OTHER PUBLICATIONS

Albanesi, M.G., "Thresholding Wavelets for Image Compression," *Proceedings of Compression and Complexity of Sequences 1997*, IEEE Computer Society, Positano, Italy, Jun. 11-13, 1997, pp. 374-389.

Przelaskowski, A., et al., "Effective Wavelet-Based Compression Method with Adaptive Quantization Threshold and Zerotree Coding," *Proceedings of the SPIE 3229*:348-356, Nov. 3, 1997, Bellingham, Wash.

* cited by examiner

*Primary Examiner*—Duy M. Dang
(74) *Attorney, Agent, or Firm*—McDermott Will & Emery LLP

(57) ABSTRACT

A monitoring unit monitors continuously wavelet transform component output from a wavelet transformer. When a condition "make all the components of the HH sub-band 0" is applied as a quantization strategy, the monitoring unit detects the maximum value N among the components in the HH sub-band and determines the threshold as N+1. The threshold is then sent to a quantizer.

7 Claims, 5 Drawing Sheets

IMAGE QUANTIZATION AND CODING BASED ON ADAPTIVE THRESHOLD

BACKGROUND OF THE INVENTION

1. Field of the Invention

This invention relates to a technique for quantization of images. This invention especially relates to a method and apparatus for image quantization, and an apparatus for coding images using the quantization method.

2. Description of the Related Art

In recent years digital image culture has become commonplace in our daily life as various information devices such as personal computers, digital cameras and color printers have been introduced into our homes and the number of Internet users has exploded. Image compression technology such as JPEG (Joint Photographic Expert Group) and MPEG (Motion Picture Expert Group) for still images and motion images respectively has been standardized. Image distribution and reproduction have become easy and convenient for users using recording media such as CD-ROM and transmission media such as networks and broadcasting technology based on the aforementioned image compression technology. JPEG 2000 has been announced in the JPEG line of technology. In MPEG also, future target specifications have been planned and discussed. There is no doubt that image processing technology will soon play an important role in improving the functionality of digital devices.

In the field of digital camera, for example, so-called mega-pixel cameras are a mainstream item in the consumer market. Demand for improved image quality seems endless. However, more processing time and power are required to handle images of finer quality.

SUMMARY OF THE INVENTION

In the context of the above, the inventor of the present invention has considered the problem presented below. JPEG or other image compression technology is used when storing an image in a digital camera or the like. In this compression process, the image is subject to transform in order to be decomposed into a spatial frequency domain. The components in the spatial frequency domain are then quantized. The threshold for the quantization is fixed at the initial stage. The threshold must be adjusted and the quantization must be repeated when a desired compression ratio is not achieved. This trial and error process may prolong the time required for the process and increase power consumption, which may in turn affect the value of the camera as a consumer product.

It is therefore an object of the present invention to provide a technique to improve the efficiency of the process of image quantization. It is another object of the present invention to provide an image coding technology using the quantization technique.

The objects are achieved by combinations described in the independent claims. The dependent claims define further advantageous and exemplary combinations of the present invention.

According to one aspect of the present invention, an image quantization method is provided. The method comprises: conducting a predetermined process on an original image, and quantizing data obtained by the predetermined process, wherein prior to the quantizing process, a threshold for the quantization is adaptively determined by referring to the data.

The "predetermined process" may be DCT (Discrete Cosine Transform) as employed in JPEG and MPEG, wavelet transform as employed in JPEG 2000, and so on. The "predetermined process" maybe other processes such as image coding by any method, scaling, enlarging or reducing the resolution or the size of an image, rotation, trimming, edge emphasis or high-pass filtering, smoothing, noise reduction or low-pass filtering, color translation, or simply inputting an image and the like.

In this aspect, the threshold for the quantization is not fixed but adaptively determined according to the result of the transform process so that the aforementioned repetition of quantization process may be skipped or reduced in size as the threshold can be determined presuming the final stage of the image processing including image coding after the quantization.

According to another aspect of the present invention, the threshold is determined in such a manner that the amount of data appearing after the quantization becomes minimum while the image quality is maintained at the same or at least practically at the same level. Here, the image quality maybe estimated objectively. Generally, the quality of images is practically the same when the low frequency components of the images are reproduced in the same degree. "The final stage" or "the stage after the quantization" is a stage immediately after the quantization or a stage where the coding is taking place or a stage where a coded bit stream is being formed.

The transforming process may conduct wavelet transform on the basis of JPEG 2000. The threshold in this case may be determined by reference to at least one of the four sub-bands generated in the wavelet transform. Hereinafter "wavelet transform components of the LL sub-band" are referred to simply as "the LL sub-band" or "components of the LL sub-band" and so on.

According to another aspect of the present invention, an image quantization apparatus is provided. The apparatus comprises: a transformer which conducts a transform process on an original image on the basis of a spatial frequency, a monitoring unit which adaptively determines a threshold for quantization referring to data output from the transformer, on the basis of a predetermined condition, and a quantizer which quantizes the data output from the transformer using the threshold.

According to yet another aspect of the present invention, an image coding apparatus is provided. The apparatus comprises the image quantization apparatus mentioned above and a coder which entropy-codes the quantized data.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but exemplify the invention. In the below embodiments, JPEG 2000 is adopted for image coding.

Embodiment 1

Figure 1:
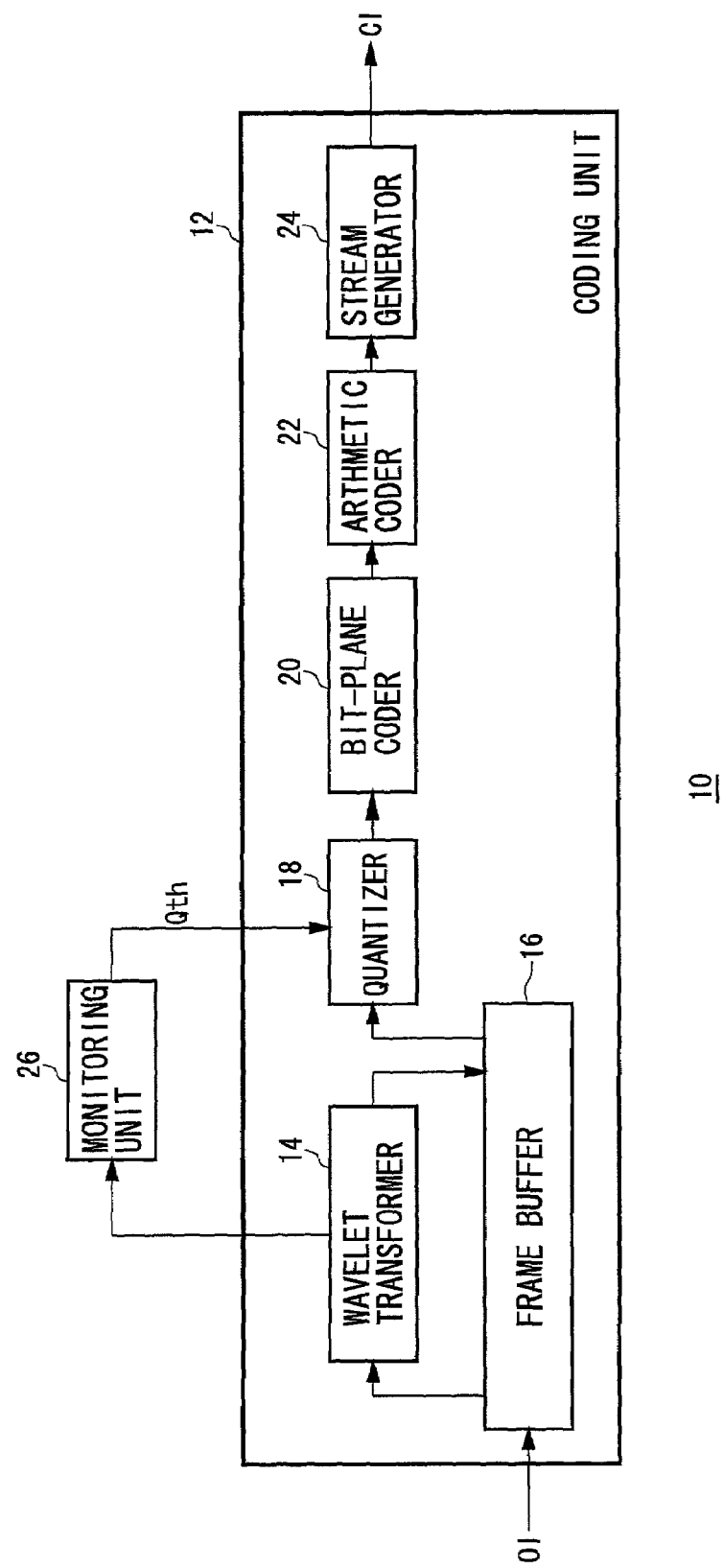
FIG. 1 is a block diagram of the image coding apparatus according to Embodiment 1.
Figure 2:
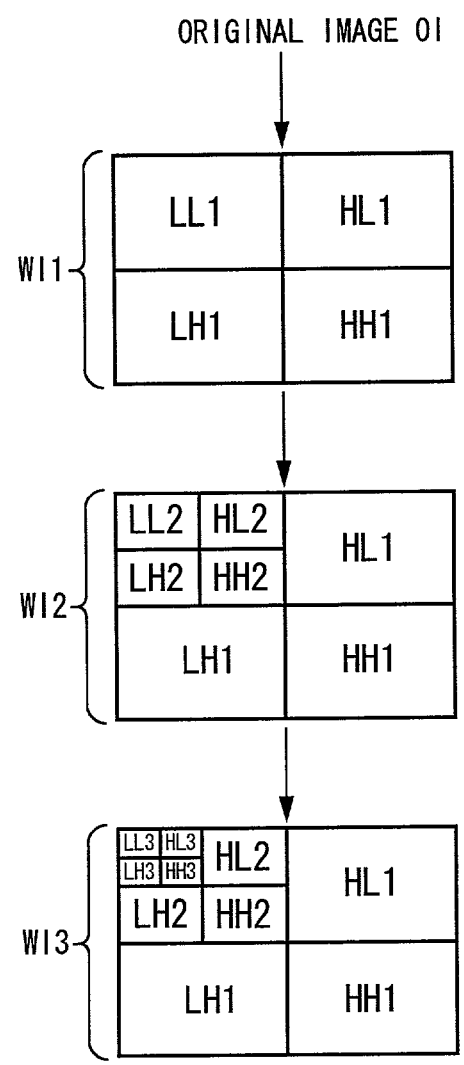
FIG. 2 shows a process to render an image hierarchy by the wavelet transformer according to Embodiment 1.

FIG. 1 shows the configuration of an image coding apparatus 10 according to Embodiment 1. FIG. 2 shows the process to make an image hierarchy by a wavelet transform which is conducted in one stage of image coding. The image coding apparatus 10 may be a normal computer and comprises a CPU, memory and program modules to code images loaded in the memory. The blocks in FIG. 1 depict functions characteristic of the present embodiment and those skilled in the art understand the functional blocks can be embodied as hardware only, software only or a combination of the two. Here, the entire coding process of JPEG 2000 is first explained, followed by the adaptive determination of a threshold value for the quantization process which is characteristic of the present embodiment.

The image coding apparatus 10 comprises a coding unit 12 and a monitoring unit 26. The coding unit 12, which works on the specifications of JPEG 2000, comprises a wavelet transformer 14, a frame buffer 16, a quantizer 18, a bit-plane coder 20, an arithmetic coder 22, which is a kind of entropy coder, and a stream generator 24. An image quantization apparatus according to the present invention may be composed of the monitoring unit 26 and the quantizer 18.

The original image OI is read in the frame buffer 16 as the starting process. The original image OI in the frame buffer 16 is hierarchized by the wavelet transformer 14. The wavelet transformer 14 in JPEG 2000 employs a Daubenchies filter. The filter simultaneously works as a low-pass filter and a high-pass filter in x, y directions and divides the original image into four frequency sub-bands. The four sub-bands are: the LL sub-band which is composed of low frequency components in x and y directions, HL and LH sub-bands which are composed of low frequency components in one of the x and y directions and high frequency components in the other direction, and the HH sub-band which is composed of high frequency components in x and y directions. The number of pixels in each sub-band image is half of those of the original image, respectively. The filtering process therefore renders four sub-band images, the sizes of which are one-fourth the size of the input image.

The wavelet transformer 14 conducts a filtering process on the rendered LL sub-band, which is divided into LL, HL, LH and HH sub-bands. By repeating the filtering process, the LL sub-band rendered in the final filtering is obtained as an image which is closest to the DC component of the original image OI. High frequency components are dominant in a HH sub-band, followed by HL and LH sub-bands, and LL image in the same layer. The previous layer rendered in the previous filtering process comprises four sub-bands in which high frequency components are more dominant than those rendered in the present filtering process. In FIG. 2, for example, the upper left sub-band image has lower frequency components and the bottom right sub-band image has higher frequency components. In this figure, the filtering process has been applied three times so that the third layer image WI3 is rendered from the second layer image WI2, which is rendered from the first layer image WI1. In these images WI1-3, the sub-bands are denoted as LL1-HH1, LL2-HH2 and LL3-H3.

Figure 3:
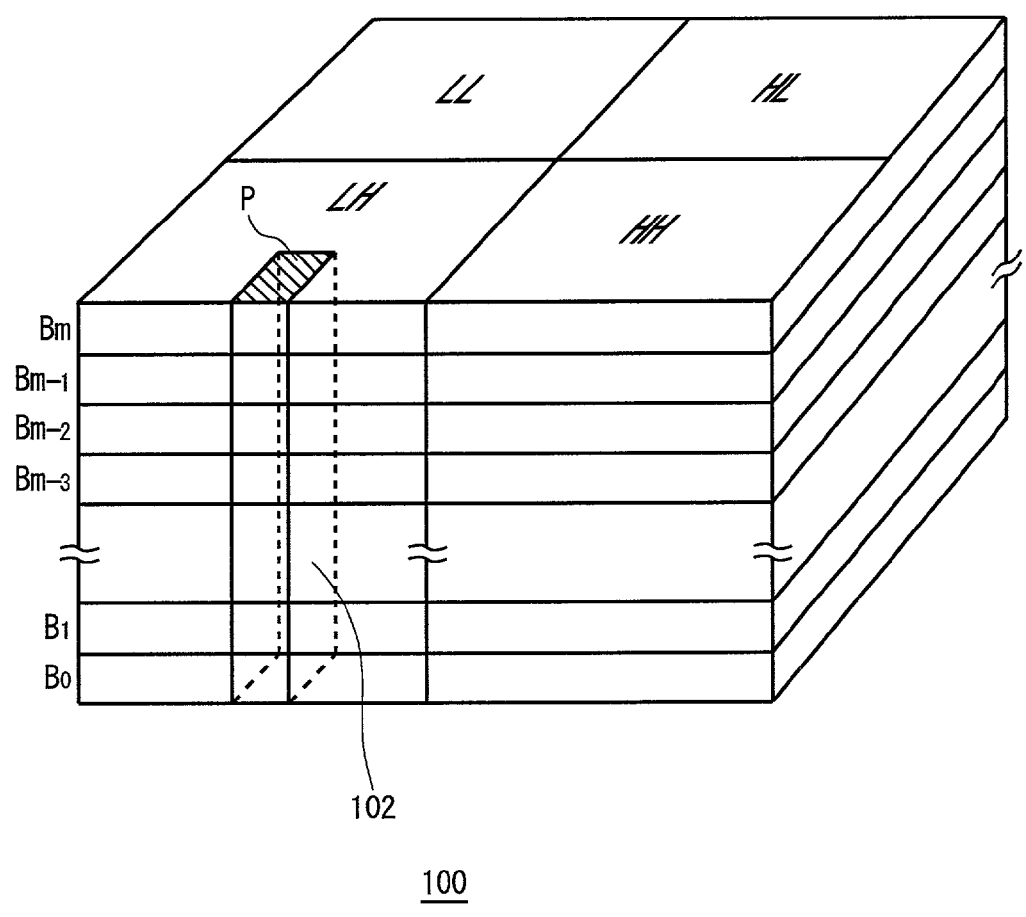
FIG. 3 shows the bit-planes of the wavelet transform components.

FIG. 3 illustrates the configuration of a wavelet transform coefficient 100 or data 100 generated by the wavelet transform in JPEG 2000. Here four sub-bands: LL, HL, LH, HH are shown in a certain layer configuration. The layer configuration itself is not important here and only the sub-bands are explained for the sake of convenience.

Figure 4:
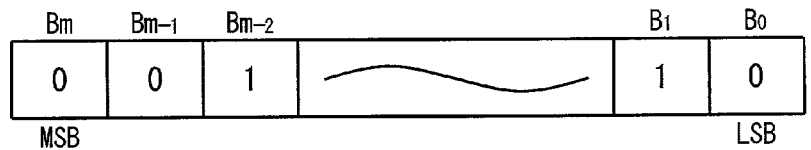
FIG. 4 shows a configuration of the wavelet transform components regarding a certain pixel.

The wavelet transform coefficient 100 comprises a plurality of bit-planes $B_M, B_{M-1}, \ldots B_1$ and $B_0$. Each bit-plane corresponds to one bit between the MSB (Most Significant Bit) and the LSB (Least Significant Bit) of the wavelet transform coefficient 100 of one of the four sub-bands. In this figure, MSBs of the pixels of the four sub-bands or MSBs of the wavelet transform components of the four sub-bands are gathered together to compose the bit-plane $B_M$. In the same manner, LSBs of the pixels or the wavelet transform components are gathered together to compose the bit-plane $B_0$. The wavelet transform components 102 of a certain pixel P in the LH sub-band is expressed in (m+1) bits as shown in FIG. 4. The wavelet transform coefficient 100 of each sub-band is input to the quantizer 18, the bit-plane coder 20, the arithmetic coder 22 and the stream generator 24 starting with the lowest frequency component, and the final coded image data CI is generated and output from the stream generator 24.

The function of the monitoring unit 26 is to adaptively determine the threshold for the quantization in such a manner that the amount of the code becomes practically minimum while maintaining practically the same image quality when decoded. The monitoring unit 26 continuously monitors the output of the wavelet transformer 14 or the wavelet transform coefficient 100 for this purpose.

Figure 5:
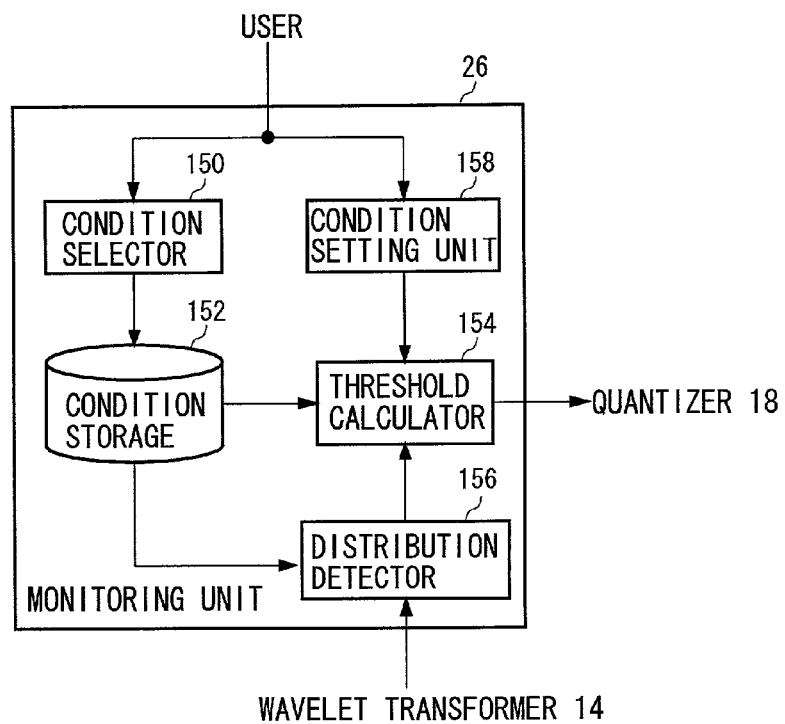
FIG. 5 is a block diagram of the monitoring unit according to Embodiment 1.

FIG. 5 shows the internal structure of the monitoring unit 26. The monitoring unit 26 comprises a condition storage 152 for holding predetermined conditions, a condition selector 150 for selecting and designating a predetermined threshold determination condition (hereinafter referred to simply as "the condition") in accordance with a user's instruction, a condition setting unit 158 for receiving a new condition which is not in the condition storage 152, from the user, a threshold calculator 154 for calculating a threshold based on the condition read from the condition storage 152 or input via the condition setting unit 158 and a distribution detector 156 for detecting the distribution in a necessary range of the wavelet transform components for the threshold calculation. The condition selector 150 and the condition setting unit 158 each obtains a user's instruction via a screen provided by a driver and the like for setting the operation mode of the apparatus.

The condition storage 152, for example, is pre-stored with the below conditions as default settings.

Condition A: Detect the minimum threshold at which the total of all the wavelet transform components in the HH sub-band becomes zero, Condition B: Detect the minimum threshold at which the number of the wavelet transform components in the HL sub-band all become less than 3, Condition C: Detect the minimum threshold at which the number of the wavelet transform components in the LH sub-band all become less than 3, when the number of the MSB bit of the three bits being "1" becomes larger than 10, detect the minimum threshold to reduce all the components to two bits.

When the user instructs the condition selector 150 to select "Condition A", Condition A is fed to the threshold calculator 154 and the distribution detector 156. The distribution detector 156 monitors the wavelet transform components of the HH sub-band and specifies the maximum value N, which is sent to the threshold calculator 154. The threshold calculator 154, having received Condition A, determines the threshold Qth for the HH sub-band as N+1, which is sent to the quantizer 18. The quantizer 18 utilizes the threshold Qth when quantizing the HH sub-band so that all the wavelet transform components of the HH sub-band are reduced to 0. Alternately, the quantizer 18 may skip the quantization of the HH sub-band and simply output 0.

When the user instructs the condition selector 150 to select Condition B, the distribution detector 156 monitors the wavelet transform components of the HL sub-band and detects the maximum value N, which is transmitted to the threshold calculator 154. The threshold calculator 154, having received Condition B, determines the threshold value Qth as the minimum integer which meets the following condition.

$$N/Qth<8$$

The threshold Qth thus determined is sent to the quantizer 18, which utilizes this value for the quantization.

When the user instructs the condition selector 150 to select Condition C, the distribution detector 156 monitors the wavelet transform components of the LH sub-band and detects the maximum value N and the 10th maximum value $N_{10}$, which are sent to the threshold calculator 154. The threshold calculator 154, having received Condition C, determines the threshold value Qth as follows.

"Detect minimum integer Qth which meets $N/Qth<8$. Determine Qth as the threshold when $N_{10}/Qth<4$ is met. Otherwise determine the minimum integer which meets $N_{10}/Qth<4$ as Qth."

Quantization using the pre-stored conditions is thus explained. However, the user may use the condition setting unit 158 to adopt a new condition. The condition setting unit 158 may accept a Boolean operation for setting a condition as follows.

"Condition 1 and Condition 2", where

Condition 1: Detect the minimum threshold with which the number of the wavelet transform components of the LL sub-band is less than s, Condition 2: Detect the minimum threshold with which the number of the wavelet transform components of the HH sub-band is less than t, Here, the user can set the values s and t. The distribution detector 156 and the threshold calculator 154 may conduct monitoring and calculation processes in accordance with the user's instruction regarding the new condition.

According to this embodiment, the number of retries at quantization calculation can be reduced as the threshold for the quantization can be determined during the wavelet transform. The image quality according to a prior quantization method by which a few wavelet translation components remain non-zero is almost the same as the image quality according to this embodiment by which all the wavelet transform components of the HH sub-band are reduced to 0, as the human eye is not very sensitive to the high frequency components of an image. Even when the image quality is practically the same, the prior quantization method requires codes for the wavelet transform components of the HH sub-band and a data region in a coded bit stream to assign the codes, which degrades the compression ratio greatly. The present embodiment can avoid such a situation.

Embodiment 2

Figure 6:
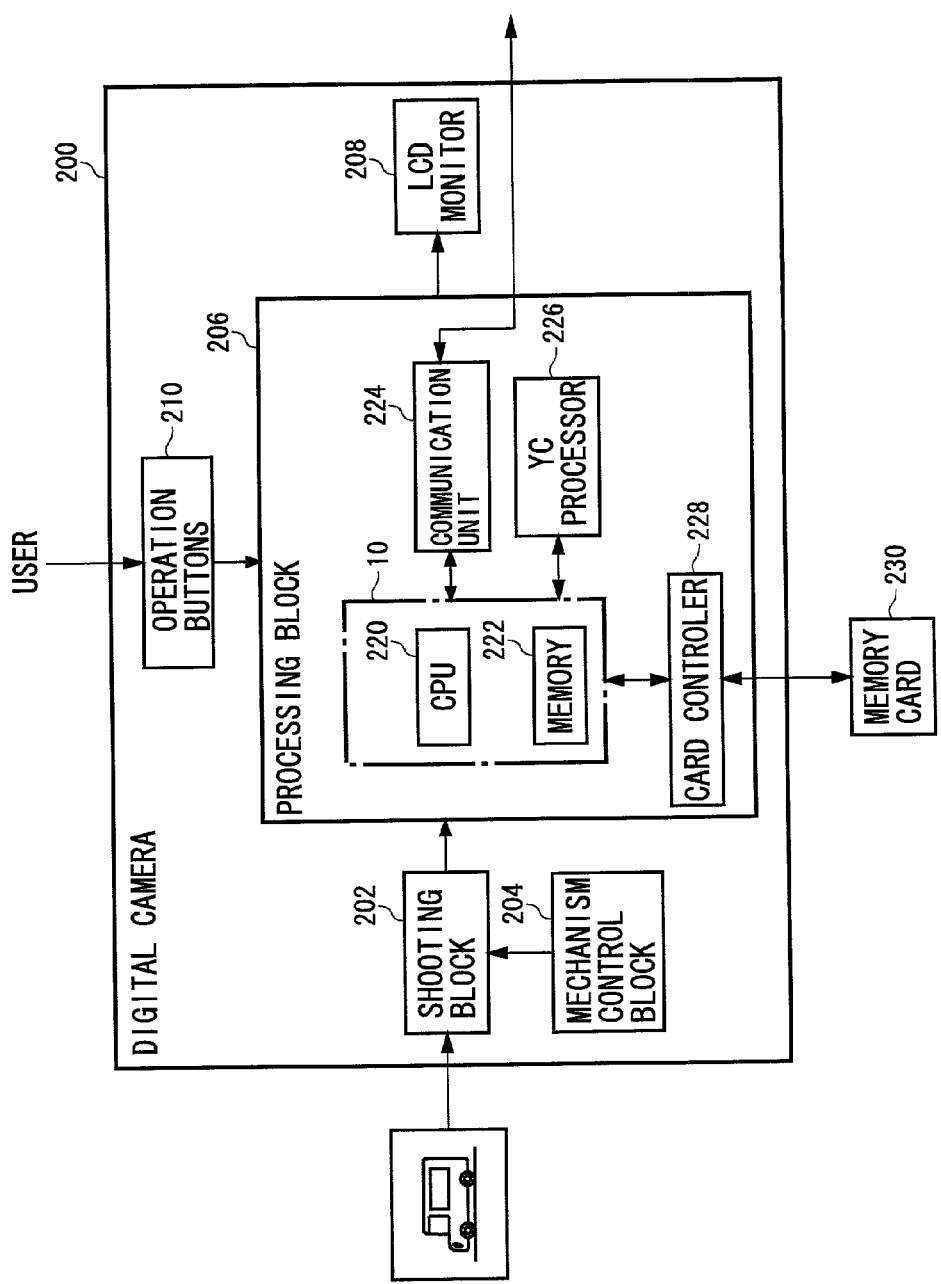
FIG. 6 is a block diagram of the digital camera according to Embodiment 2.

FIG. 6 shows the configuration of a digital camera 200 according to Embodiment 2. The digital camera 200 comprises a shooting block 202, a mechanism control block 204, a processing block 206, an LCD monitor 208 and operation buttons 210.

The shooting block 202 comprises a lens, a lens stop, an optical low-pass filter (LPF), a CCD and a signal processor (not shown). The CCD accumulates charge according to the amount of light received from an object imaged on the light receiving plane of the CCD. The charge is read as a voltage signal, which is decomposed into R, G and B components in the signal processor. The components are subject to white balance adjustment and gamma correction. The R, G and B signals are then input to an A/D converter from which digital image data are output to the processing block 206.

The mechanism control block 204 controls the optical system including zooming, focusing and iris of the shooting block 202. The processing block 206 comprises a CPU 220, memory 222, a YC processor 226, a card controller 228 and a communication unit 224. The image coding apparatus 10 of Embodiment 1 is realized with some of the functions of the CPU 220, an image quantization and coding program loaded in the memory 222 and other circuitry not shown. The frame buffer 16 of Embodiment 1 is realized using part of the memory 222.

The YC processor 226 generates from the digital image data a luminance signal Y, chroma signals B-Y and R-Y. The luminance signal and the chroma signals are separately coded in the original image OI. The coded image data CI is output via the communication unit 224 or is written in the memory card 230 via the card controller 228.

The communication unit 224 conducts a protocol transform in accordance with a standardized communication specification. The communication unit 224 may transmit data from and to a printer, a game player and other external devices via respective interfaces.

The LCD monitor 208 displays the image of an object, shooting/replay mode, zoom ratio, date, and so on. The operation buttons 210 may include a power switch, a release switch and so on to shoot a picture or to set operational modes.

In this configuration, the following operations can be provided with the image coding apparatus 10 incorporated in the processing block 206.

1. A still image is shot as a snapshot and is compressed and recorded in the memory card 230. In this process, the number of retries in the quantization is reduced while the image quality is maintained. The camera may be provided with a function to enable a user to choose the image quality from, for example, "extra-fine/fine/normal/high compression/indexing purpose". These image levels may be associated with the aforementioned conditions.

2. Motion images can be shot while still images are being recorded. The motion image can be shot in a reduced resolution and can be compressed and recorded in the memory card 230. The quantization becomes effective while the desired image quality is maintained. The effective coding and compression according to the present embodiment is naturally useful not only when the data are recorded in the memory card 230, but also when the data are output to a printer directly or uploaded to a Web page via the communication unit 224 and the Internet.

Although the present invention has been described by way of exemplary embodiments, it should be understood that many changes and substitutions may be made by those skilled in the art without departing from the spirit and the scope of the present invention which is defined only by the appended claims. Such changes and substitutions may be provided as follows.

In the preferred embodiments, wavelet transform has been assumed prior to quantization. The process, however, may be a DCT transform employed in MPEG and JPEG. The present invention may be applied to quantization of the DCT components.

The stage prior to quantization may be a process to read the original image from a memory, or to shoot or receive the original image. The coding or compression of an image may start with the quantization and end with the quantization. The present invention may naturally be applied in such a case.

A digital camera was included in the explanation of Embodiment 2. The present invention, however, may naturally be applied to other electronic devices. For example, the present invention can be easily applied to a facsimile machine, a copy machine, a scanner and the like which have a shooting block and a processing block.

What is claimed is:

1. An image coding method, comprising:
    conducting a transform process on an original image on the basis of a spatial frequency,
    quantizing data obtained by the transform process, and
    entropy-coding the quantized data,
    wherein prior to the quantizing process, a threshold for the quantization is adaptively determined referring to the data output from the conducting of the transform process,
    wherein the conducting of the transform process includes a wavelet transform in accordance with JPEG 2000, and wherein the threshold is determined on the basis of at least one of four sub-bands generated by the wavelet transform.

2. A method according to claim 1, wherein the threshold is determined so that the total of all the wavelet transform components in at least one of the four sub-bands becomes zero.

3. A method according to claim 1, wherein the threshold is determined so that the number of the wavelet transform components in at least one of the four sub-bands becomes less than a predetermined value.

4. A method according to claim 1, wherein the threshold is determined with reference to a user's instruction.

5. An image coding method comprising:
    conducting a transform process on an original image on the basis of a spatial frequency,
    quantizing data obtained by the transform process, and
    entropy-coding the quantized data,
    wherein prior to the quantizing process, a threshold for the quantization is adaptively determined referring to the data output from the conducting of the transform process, and
    wherein the threshold is determined such that the amount of data appearing after the quantization becomes minimum while the image quality is maintained at the same or at least practically at the same level; and
    wherein the conducting the transform process includes a wavelet transform in accordance with JPEG 2000, and wherein the threshold is determined on the basis of at least one of four sub-bands generated by the wavelet transform.

6. An image coding apparatus, comprising:
    a transformer which conducts a transform process on an original image on the basis of a spatial frequency,
    a monitoring unit which adaptively determines a threshold for quantization referring to data output from the transformer, on the basis of a predetermined condition,
    a quantizer which quantizes the data output from the transformer using the threshold, and
    a coder which entropy-codes the quantized data, and
    wherein the transformer conducts a wavelet transform based on JPEG 2000 and wherein the monitoring unit determines the threshold on the basis of wavelet transform components of at least one sub-band of four sub-bands generated by the wavelet transform.

7. An image coding apparatus, comprising:
    a shooting block,
    a block which controls the shooting block mechanically, and
    a processing block which processes a digital image obtained by the shooting block,
    wherein the processing block comprises:
        a transformer which conducts a transform process on the shot image on the basis of a spatial frequency,
        a monitoring unit which adaptively determines a threshold for quantization referring to data output from the transformer, on the basis of a predetermined condition,
        a quantizer which quantizes the data output from the transformer using the threshold, and
        a coder which entropy-codes the quantized data, and
    wherein the transformer conducts a wavelet transform based on JPEG 2000 and wherein the monitoring unit determines the threshold on the basis of wavelet transform components of at least one sub-band of four sub-bands generated by the wavelet transform.

* * * * *